US009107390B1

(12) United States Patent
Day

(10) Patent No.: US 9,107,390 B1
(45) Date of Patent: Aug. 18, 2015

(54) PET TOY JUICER AND FOOD DISPENSER

(71) Applicant: Zigoo LLC, West Harrison, IN (US)

(72) Inventor: Stephen Z. Day, Cincinnati, OH (US)

(73) Assignee: ZIGOO LLC, West Chester, OH (US)

( * ) Notice: Subject to any disclaimer, the term of this patent is extended or adjusted under 35 U.S.C. 154(b) by 18 days.

(21) Appl. No.: 13/828,025

(22) Filed: Mar. 14, 2013

Related U.S. Application Data

(60) Provisional application No. 61/759,026, filed on Jan. 31, 2013, provisional application No. 61/677,138, filed on Jul. 30, 2012.

(51) Int. Cl.
*A01K 29/00* (2006.01)
*A01K 15/02* (2006.01)

(52) U.S. Cl.
CPC .................................. *A01K 15/025* (2013.01)

(58) Field of Classification Search
CPC ........................ A01K 15/025; A01K 15/026
USPC .................... 119/709, 710, 711, 707
See application file for complete search history.

(56) References Cited

U.S. PATENT DOCUMENTS

| | | | | |
|---|---|---|---|---|
| 3,062,370 A | * | 11/1962 | Morin | 206/440 |
| 3,283,894 A | * | 11/1966 | Hafner | 206/306 |
| 4,078,792 A | * | 3/1978 | Arato | 472/137 |
| 4,742,799 A | | 5/1988 | Schlitz | |
| 5,249,337 A | * | 10/1993 | Cross et al. | 24/129 R |
| D360,712 S | | 7/1995 | Bush | |
| 5,595,142 A | * | 1/1997 | Chill | 119/710 |
| 5,813,366 A | * | 9/1998 | Mauldin, Jr. | 119/710 |
| 5,832,877 A | * | 11/1998 | Markham | 119/710 |
| 5,935,628 A | * | 8/1999 | Hauser et al. | 426/143 |
| 5,957,082 A | | 9/1999 | Budman et al. | |
| 5,984,884 A | * | 11/1999 | Alvarez et al. | 602/6 |
| 6,112,703 A | | 9/2000 | Handelsman | |
| 6,158,391 A | | 12/2000 | Simonetti | |
| 6,405,681 B1 | * | 6/2002 | Ward | 119/707 |
| 6,918,355 B1 | * | 7/2005 | Arvanites | 119/707 |
| 7,175,069 B1 | * | 2/2007 | Tsengas | 232/43.1 |
| 7,389,748 B2 | | 6/2008 | Shatoff et al. | |
| 7,506,614 B1 | * | 3/2009 | Tsengas | 119/710 |
| 7,536,978 B2 | | 5/2009 | Washington et al. | |
| 7,600,488 B2 | | 10/2009 | Mann | |
| D625,056 S | | 10/2010 | Kelly | |
| D629,978 S | | 12/2010 | Nazimek | |
| D665,136 S | | 8/2012 | Day | |

(Continued)

OTHER PUBLICATIONS

Doggy Hoots Water Bottle Crunchers Dog Toy, Petco (Apr. 26, 2010), http://www.petco.com/product/109878/Doggy-Hoots-Water-Bottle-Crunchers-Dog-Toy, printed Sep. 15, 2011.

(Continued)

*Primary Examiner* — Rob Swiatek
*Assistant Examiner* — Ebony Evans
(74) *Attorney, Agent, or Firm* — Frost Brown Todd LLC

(57) ABSTRACT

A pet toy is configured for receiving a food item. The pet toy comprises a durable and resilient outer wall, an interior chamber, and at least one opening for inserting and/or retrieving the food item. The outer wall can comprise one or more regions of greater rigidity and one or more regions of less rigidity. The pet toy is further configured to selectively retain the food item during a pet's play with the pet toy. After repeated or sufficient compression of the pet toy, the food item can be dislodged, in either a single piece or in multiple smaller pieces, from the pet toy as the pet's reward.

8 Claims, 17 Drawing Sheets

(56) References Cited

U.S. PATENT DOCUMENTS

| | | | |
|---|---|---|---|
| 8,261,953 B2 * | 9/2012 | McSavaney | 224/148.1 |
| 2007/0022971 A1 | 2/2007 | Renforth et al. | |
| 2008/0017131 A1 * | 1/2008 | Wolfe et al. | 119/709 |
| 2008/0121190 A1 | 5/2008 | Moulton | |
| 2009/0025648 A1 | 1/2009 | Simon | |
| 2009/0114166 A1 * | 5/2009 | Saborio et al. | 119/702 |
| 2011/0061603 A1 | 3/2011 | Ragonetti et al. | |
| 2011/0192353 A1 | 8/2011 | Willinger et al. | |
| 2011/0277696 A1 | 11/2011 | Rutherford et al. | |

OTHER PUBLICATIONS

Kong Classic, Kong, http://www.kongcompany.com/products/dogs/kong-rubber-toys/classic/kong-classic, printed Sep. 14, 2011.

Water Bottle Buddies Dog Toy, dog.com.

* cited by examiner

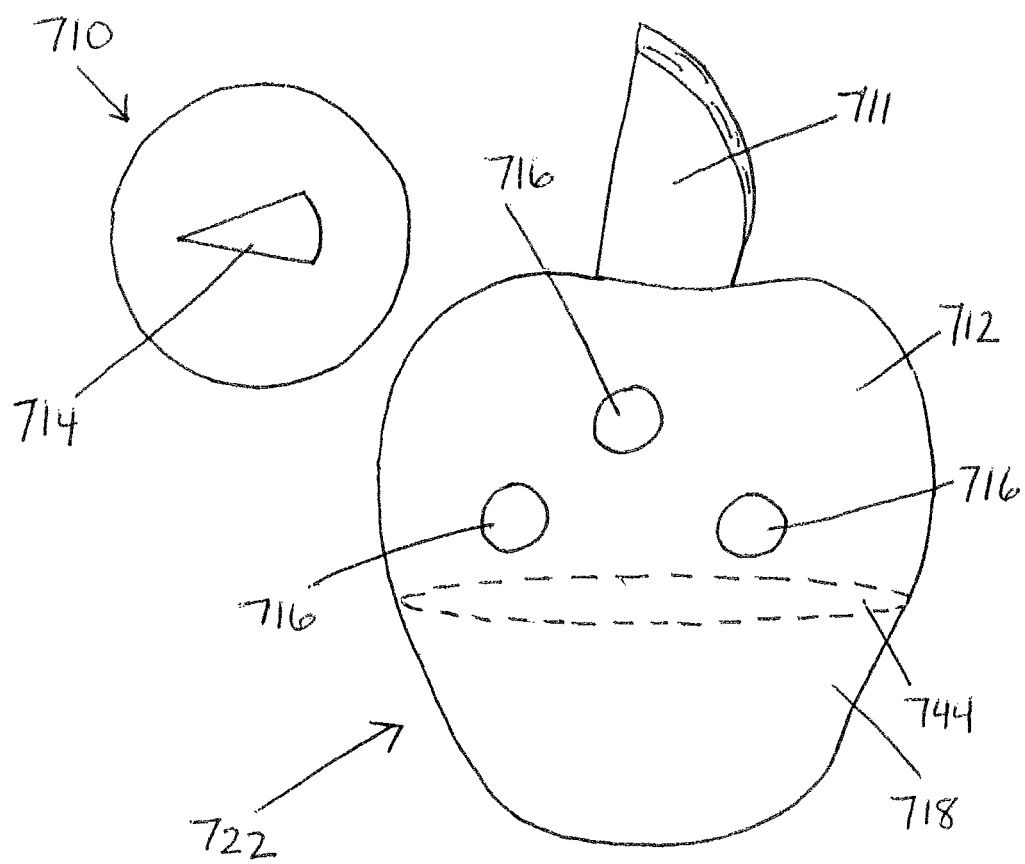

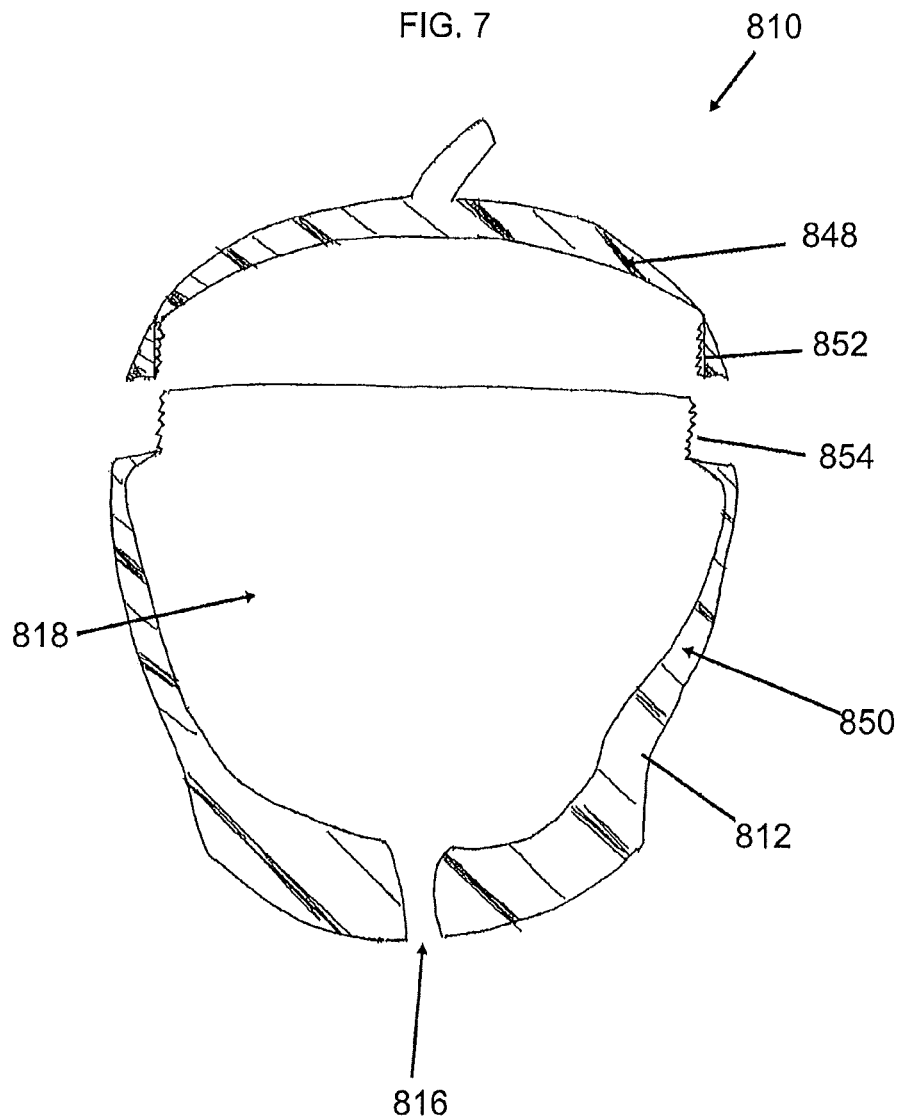

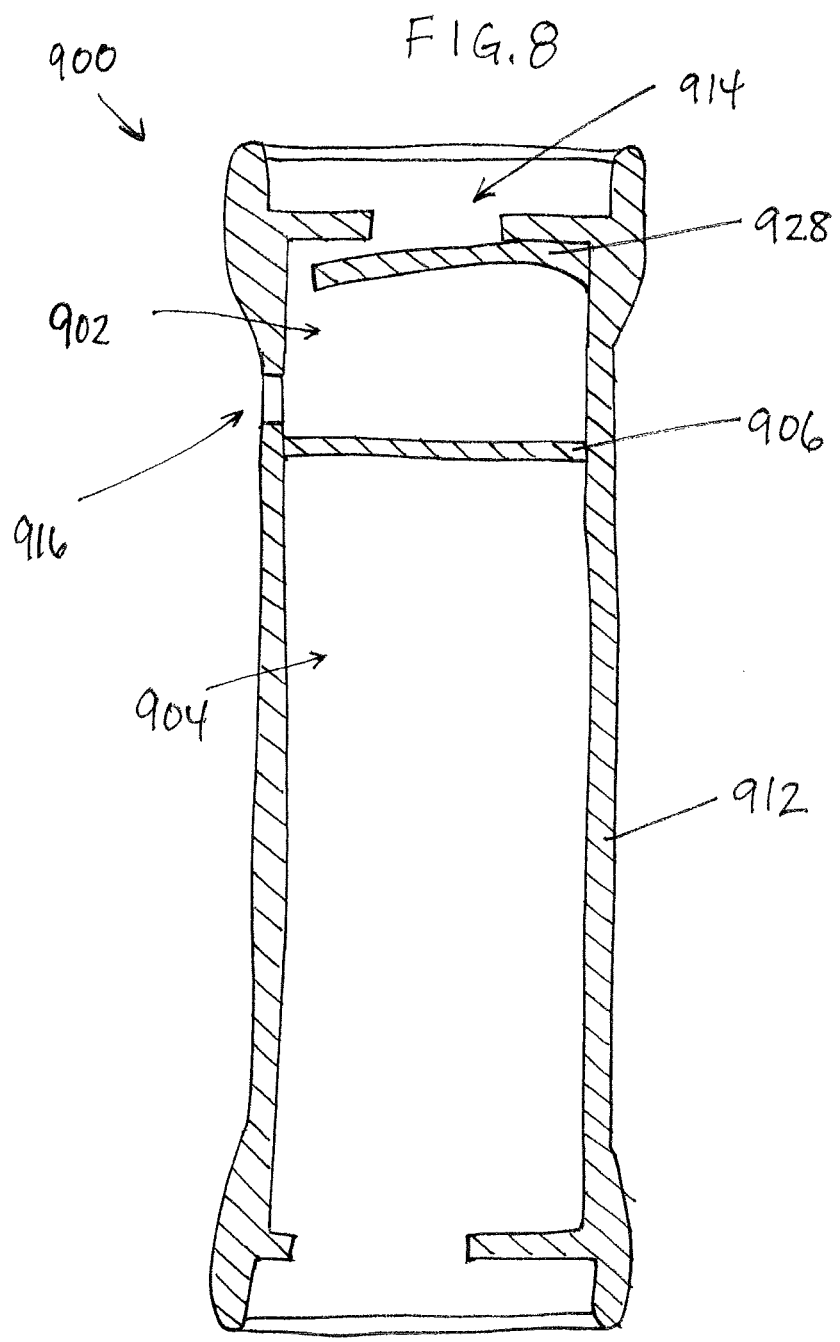

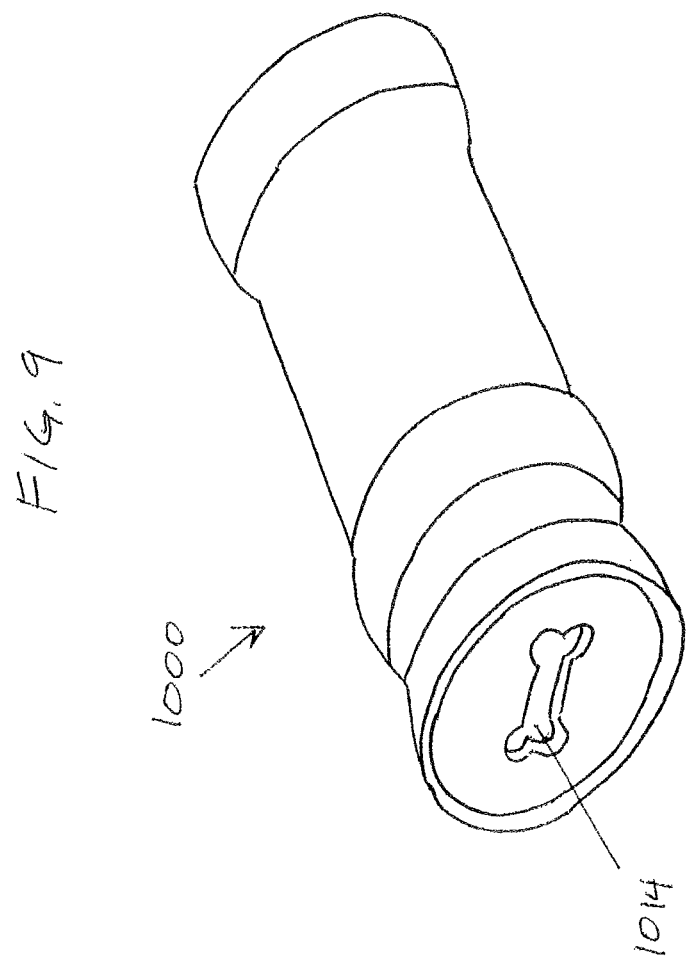

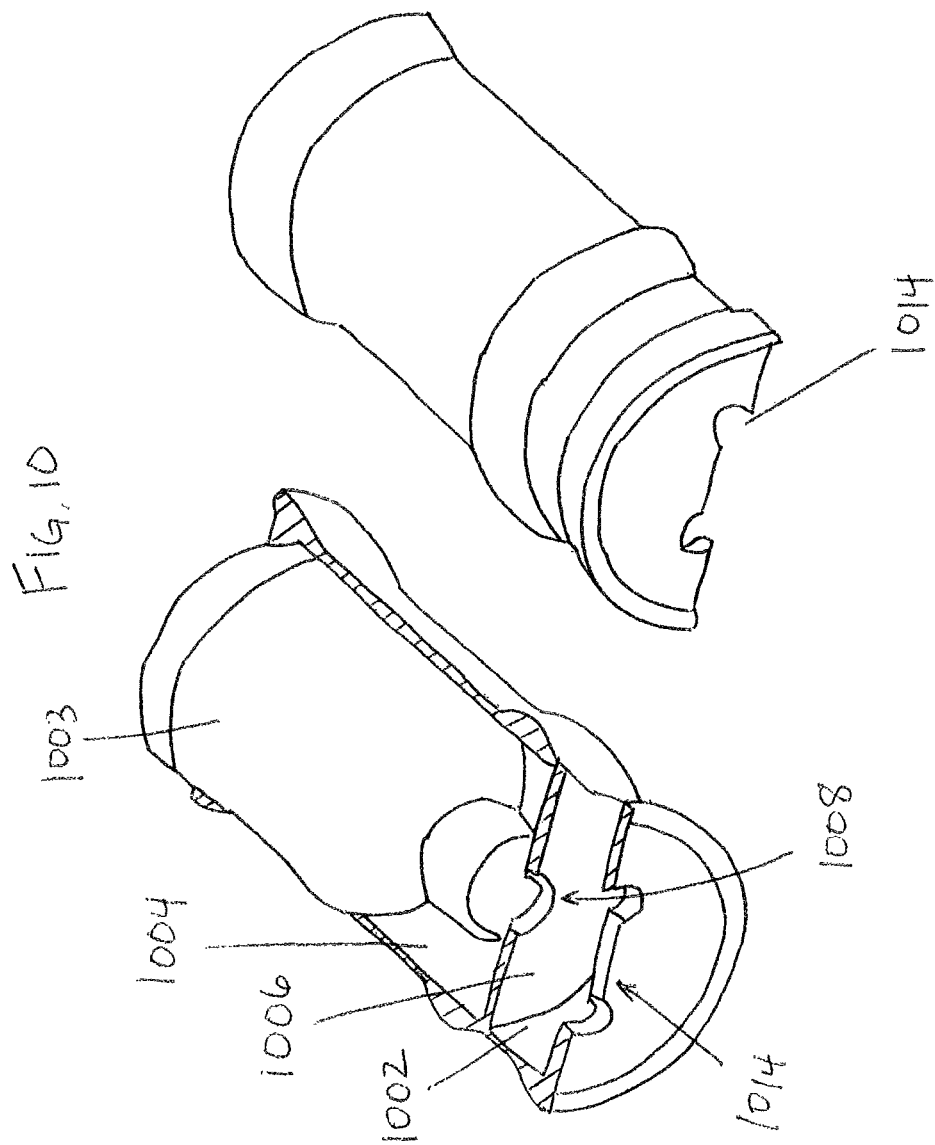

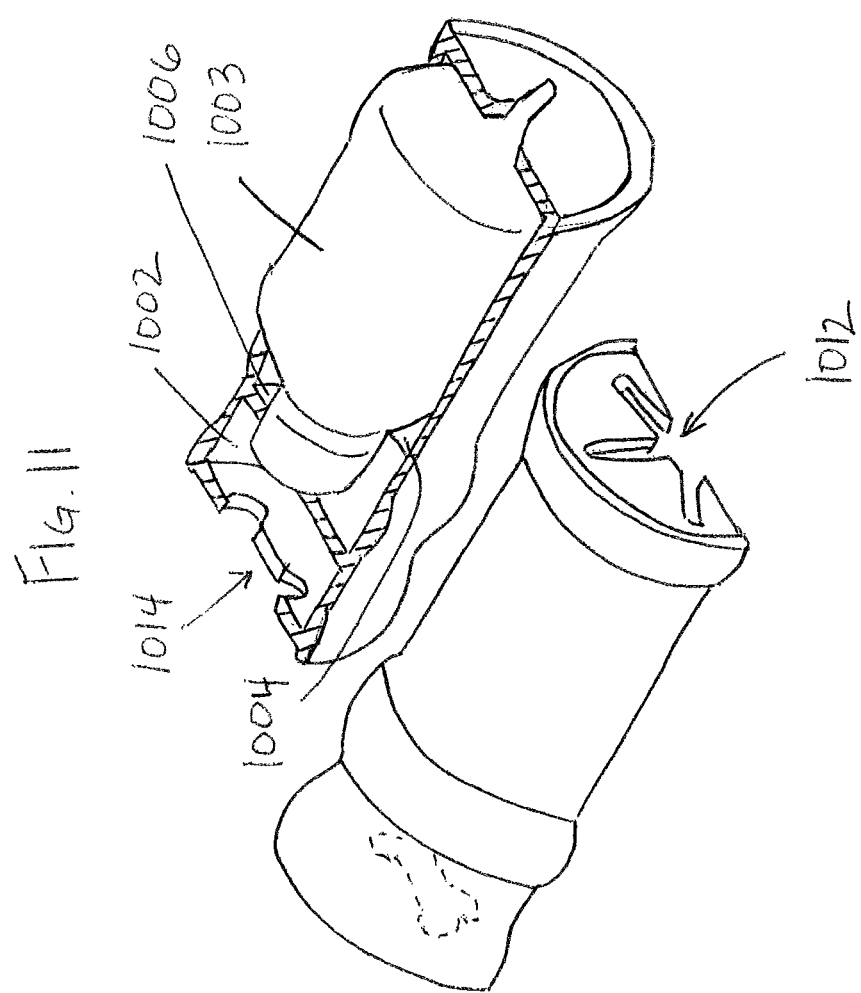

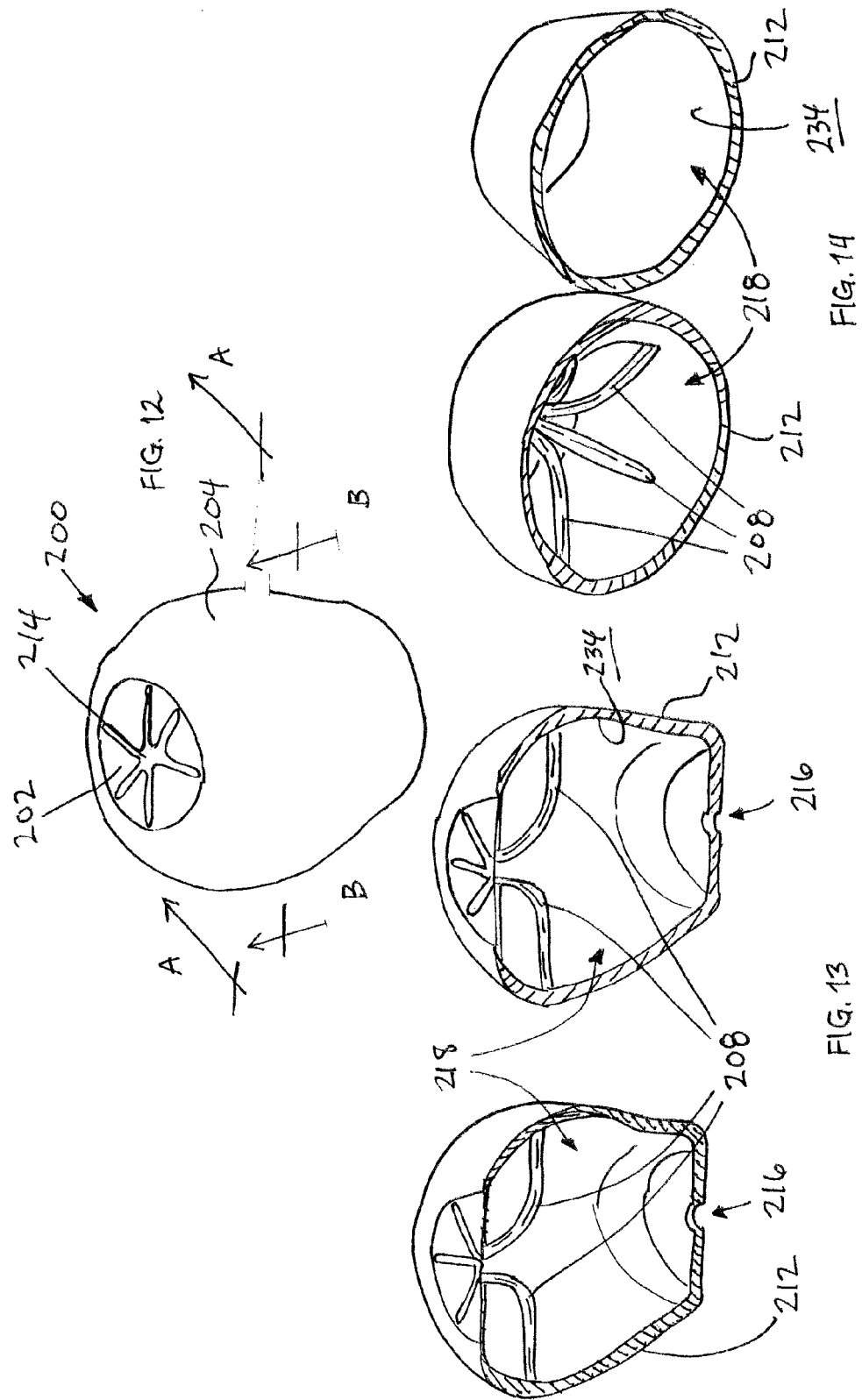

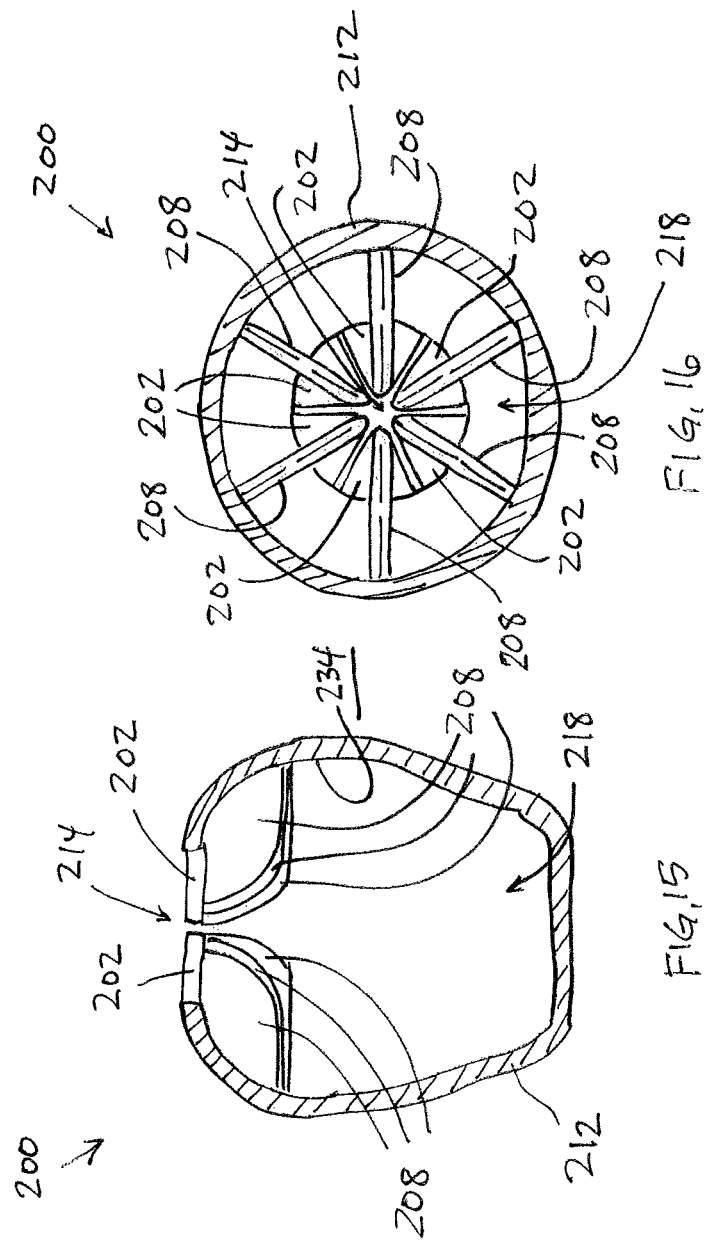

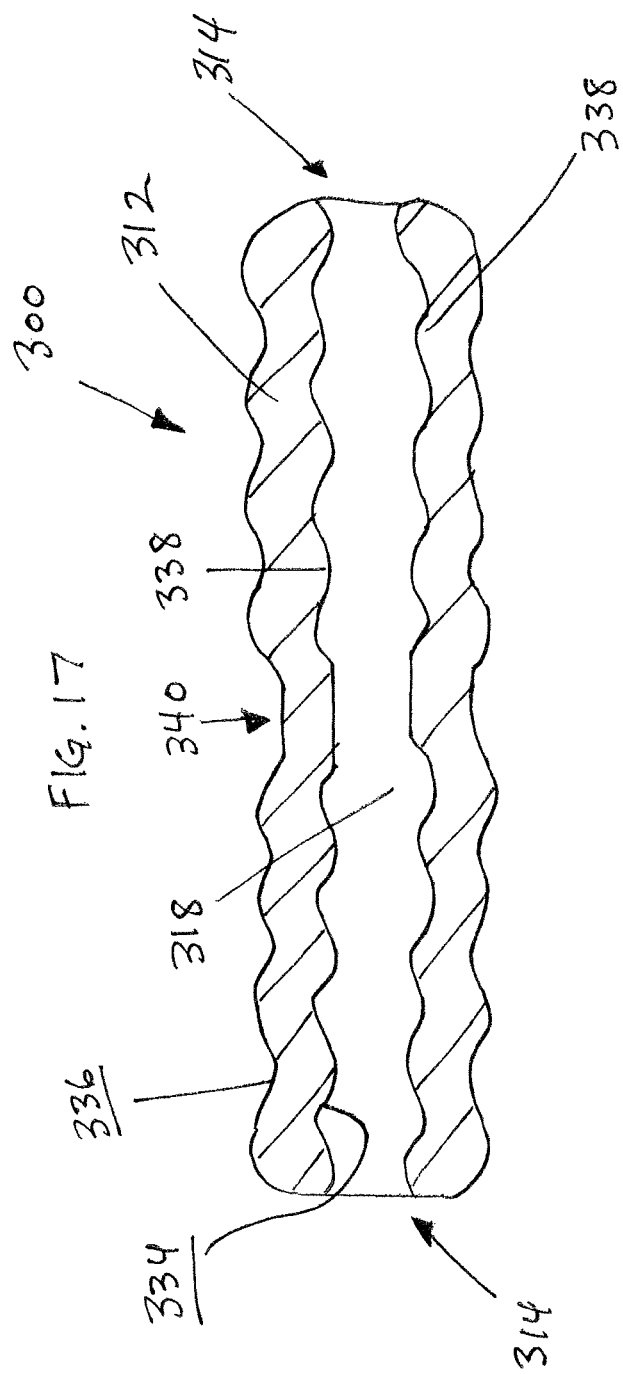

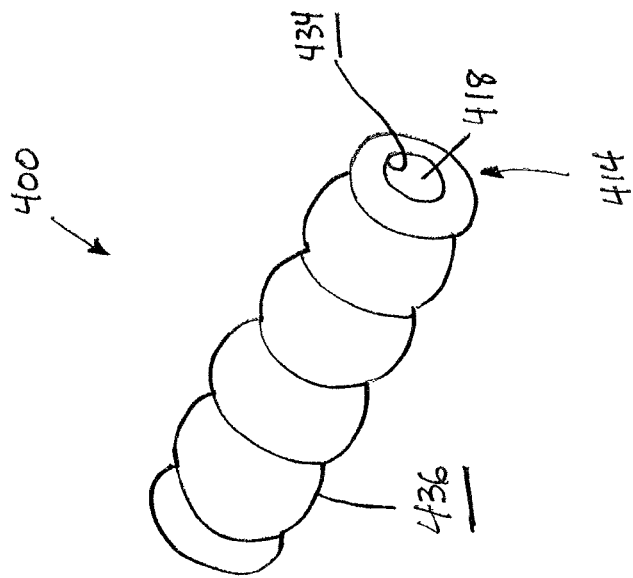
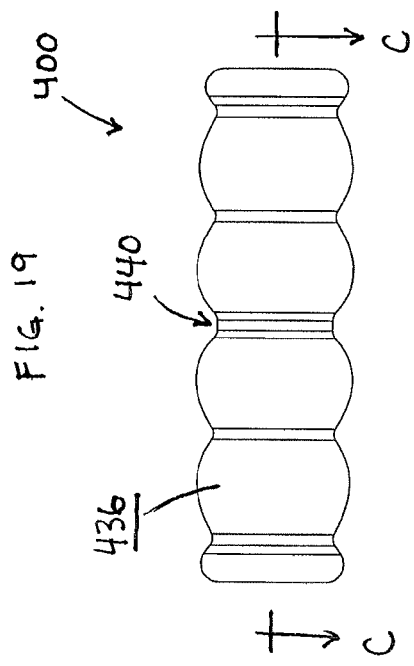
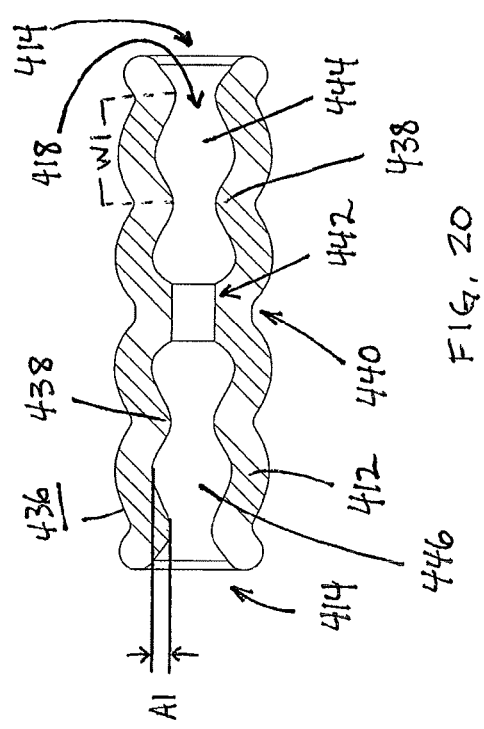

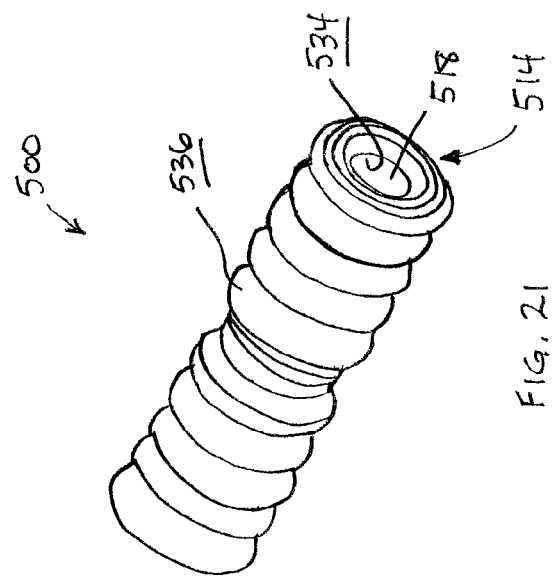
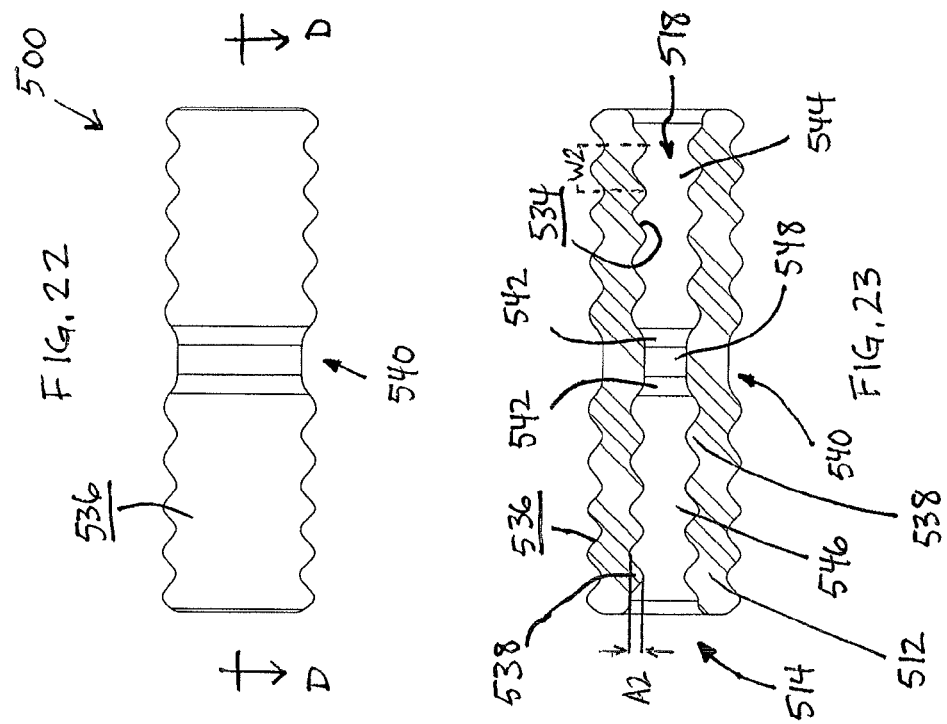

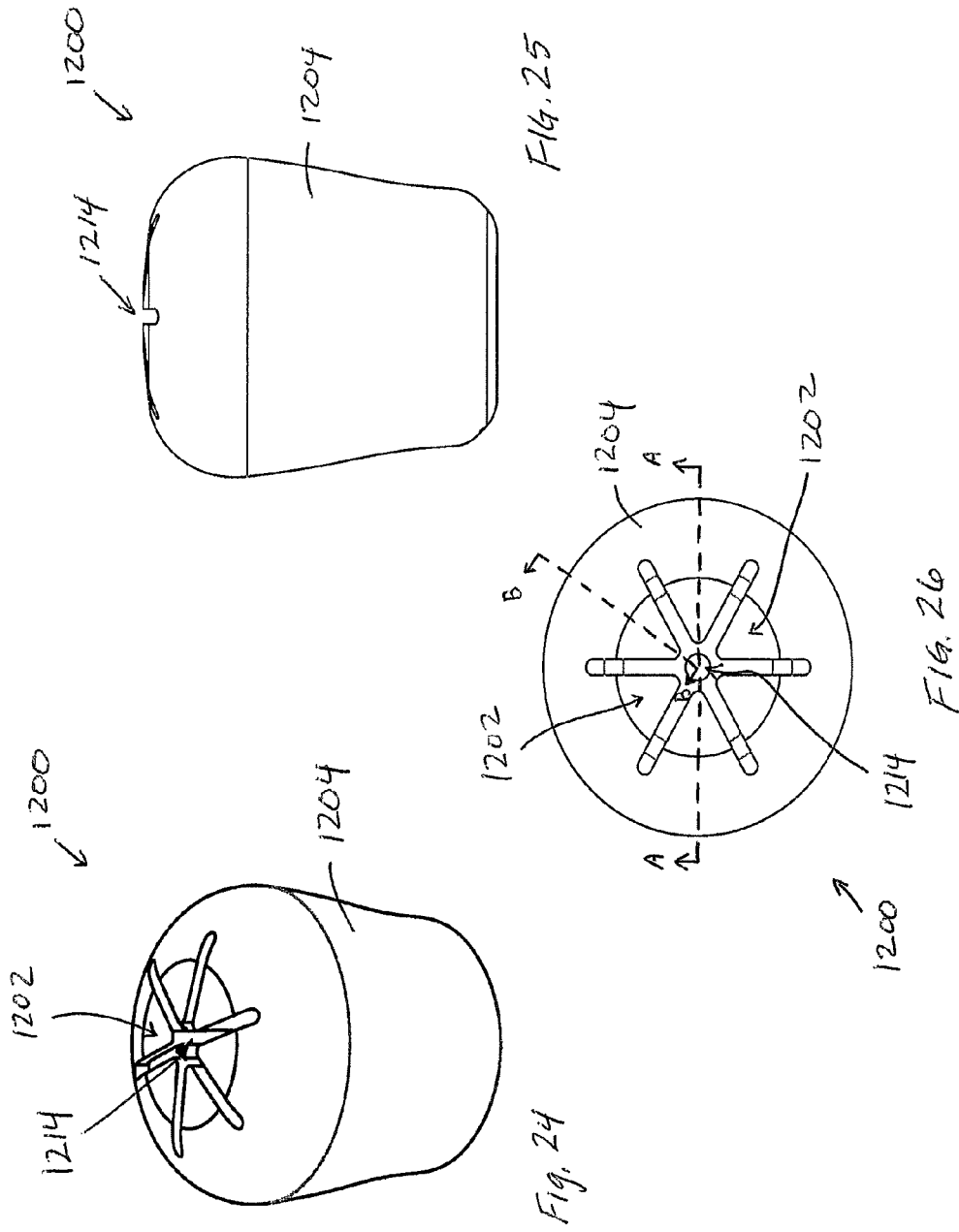

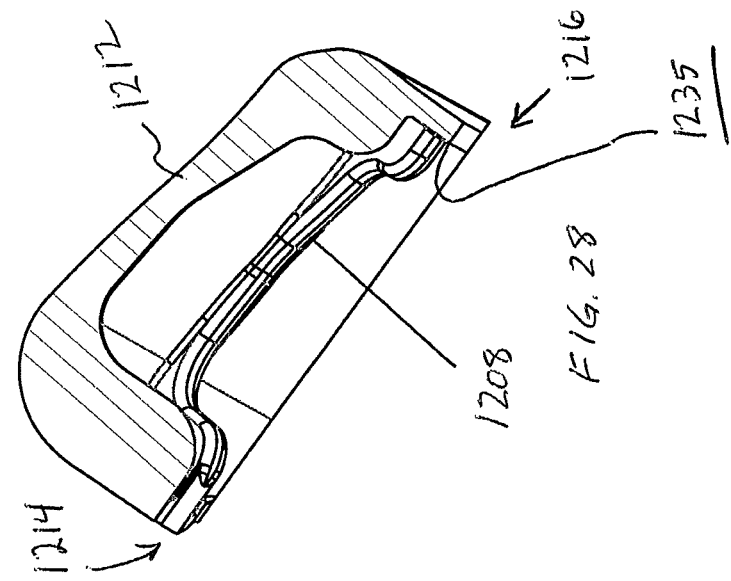
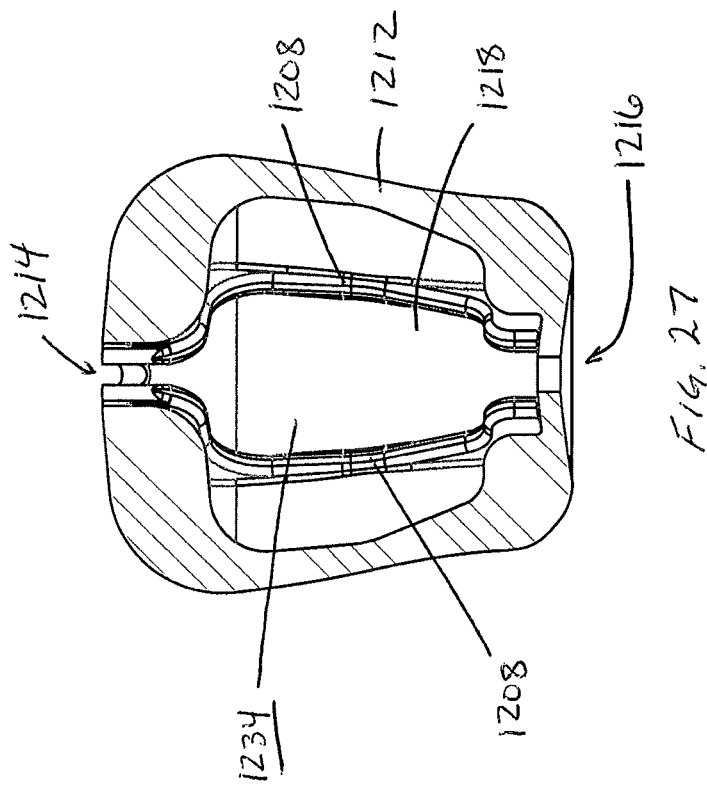

US 9,107,390 B1

PET TOY JUICER AND FOOD DISPENSER

PRIORITY

This application claims priority to U.S. Provisional Patent Application Ser. No. 61/677,138, filed Jul. 30, 2012, entitled "Pet Toy Juicer and Food Dispenser," the disclosure of which is incorporated by reference herein. This application also claims priority to U.S. Provisional Patent Application Ser. No. 61/759,026, filed Jan. 31, 2013, entitled "Pet Toy Juicer and Food Dispenser," the disclosure of which is incorporated by reference herein.

BACKGROUND

A wide variety of pet toys exist in the marketplace. Some pet toys comprise an object to chew, an object to throw and retrieve, an object that makes noise, or an object that is visually of interest to the pet. While a variety of pet toys have been made and used, it is believed that no one prior to the inventor(s) has made or used an invention as described herein.

BRIEF DESCRIPTION OF THE DRAWINGS

It is believed the present invention will be better understood from the following description of certain examples taken in conjunction with the accompanying drawings, in which like reference numerals identify the same elements.

FIG. 5 depicts a side, elevation view of alternative exemplary pet toy juicer and food dispenser with outlet ports on the side of the pet toy juicer and food dispenser, and showing in phantom a dividing wall within the pet toy juicer and food dispenser.

FIG. 6 depicts a top, plan view of the pet toy and food dispenser of FIG. 5.

FIG. 7 depicts a side, cross sectional view of an alternative exemplary pet toy juicer and food dispenser having multiple separable parts for inserting and removing food items.

FIG. 8 depicts a side, cross section view of an alternative, exemplary pet toy having dual compartments, with one compartment for use as a juicer and/or food dispenser and the other compartment for retaining an optional chewable toy item.

FIG. 9 depicts top, perspective view of an exemplary dual compartment pet toy having one compartment for use as a juicer and/or food dispenser and the other compartment for retaining an optional plastic bottle or other chewable item.

FIG. 10 depicts a top, perspective view of the dual compartment pet toy of FIG. 9 split in half.

FIG. 11 depicts another top, perspective view of the dual compartment pet toy of FIG. 9 showing the other end having a star-shaped opening.

FIG. 12 depicts a top, perspective view of an alternative exemplary pet toy juicer and food dispenser.

FIG. 13 depicts a perspective view in cross section of two halves of the exemplary pet toy juicer and food dispenser of FIG. 12, the cross section taken along line A-A of FIG. 12.

FIG. 14 depicts a perspective view in cross section of two halves of the exemplary pet toy juicer and food dispenser of FIG. 12, the cross section taken along line B-B of FIG. 12.

FIG. 15 depicts a side, cross section view of a half of the exemplary pet toy juicer and food dispenser of FIG. 12, the cross section taken along line A-A of FIG. 12 with the other half having a mirror image.

FIG. 16 depicts a cross section view of a top half of the exemplary pet toy juicer and food dispenser of FIG. 12, the cross section taken along line B-B of FIG. 12.

FIG. 17 depicts a side, cross section view of an alternative exemplary pet toy juicer and food dispenser.

FIG. 18 depicts a top perspective view of an alternative exemplary pet toy juicer and food dispenser.

FIG. 19 depicts a side, elevation view of the exemplary pet toy juicer and food dispenser of FIG. 18.

FIG. 20 depicts a side, cross section view of the exemplary pet toy juicer and food dispenser shown in FIG. 19 taken along the line C-C of FIG. 19.

FIG. 21 depicts a top, perspective view of an alternative exemplary pet toy juicer and food dispenser.

FIG. 22 depicts a side, elevation view of the exemplary pet toy juicer and food dispenser of FIG. 21.

FIG. 23 depicts a cross section view of the exemplary pet toy juicer and food dispenser shown in FIG. 21 taken along line D-D of FIG. 22.

FIG. 24 depicts a perspective view of an alternative exemplary pet toy juicer and food dispenser having an apple shape.

FIG. 25 depicts a side view of the exemplary pet toy juicer and food dispenser of FIG. 24.

FIG. 26 depicts a top view of the exemplary pet toy juicer and food dispenser of FIG. 24.

FIG. 27 depicts a side, cross section view of a half of the exemplary pet toy juicer and food dispenser of FIG. 24, the cross section taken along line A-A of FIG. 26.

FIG. 28 depicts a cross section view through one of the ribs of the exemplary pet toy juicer and food dispenser of FIG. 24, the cross section taken along line B-B of FIG. 26.

Figure 1:
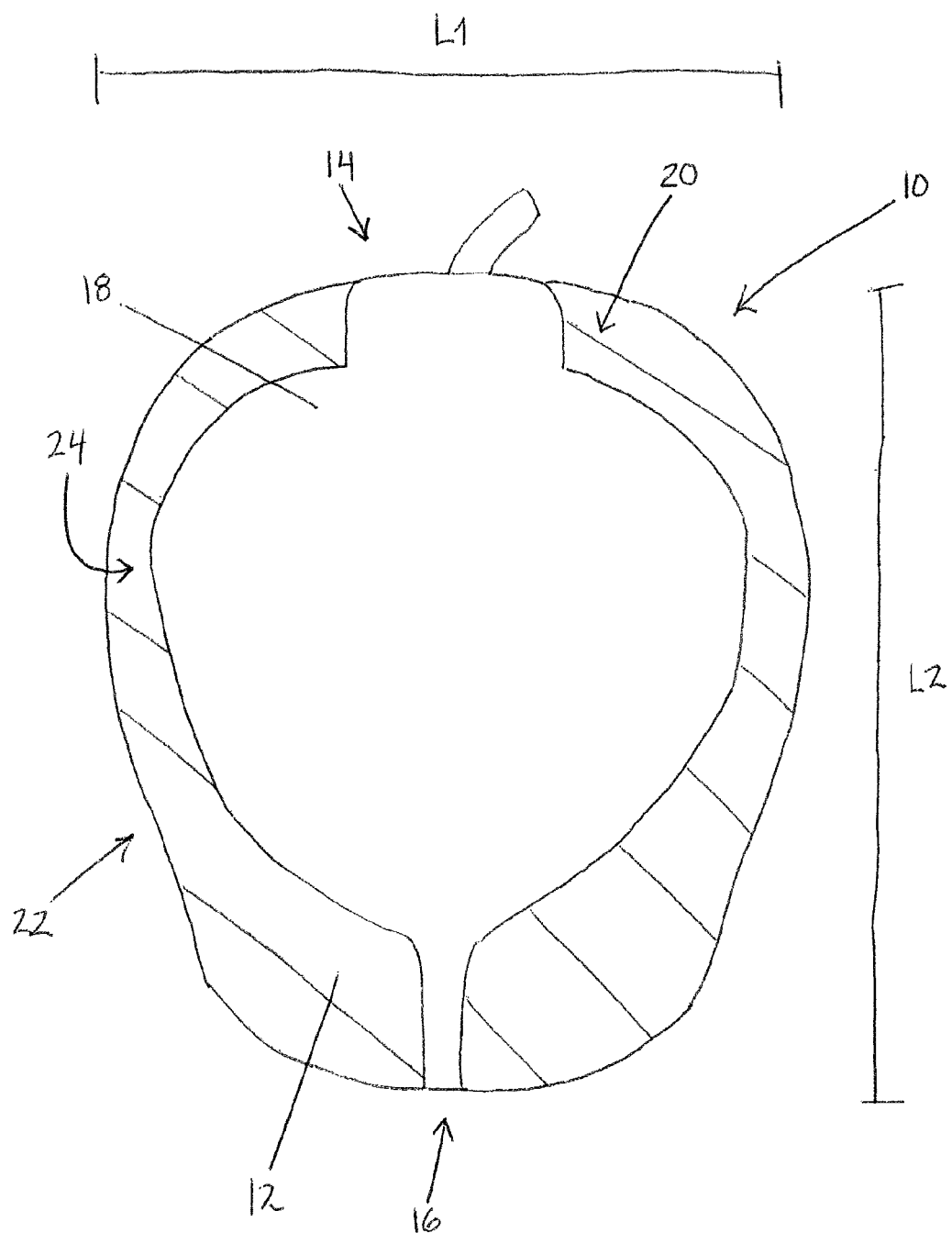
FIG. 1 depicts a side, cross section view of an exemplary pet toy juicer and food dispenser.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

FIGS. 1-23 illustrate exemplary pet toys suitable as pet toy juicer and food dispensers. The following features discussed are not considered required in all versions of the pet toy juicer and food dispenser. Instead the features discussed can be incorporated in some versions and absent in others. Furthermore, the features should be viewed as interchangeable among the various versions discussed such that a feature of one version could be applied to another version and so forth. Also, although the pet toys are described as juicer and food dispensers, in some versions the pet toy may dispense food or pieces of food with or without juicing the food.

In the present examples of FIGS. 1-7, pet toy (10) is in the shape of an apple. In other versions pet toy (10) can be in the shape of other foods, non-food items, or any other suitable shape as would be apparent to one of ordinary skill in the art in view of the teachings herein. In the illustrated version of FIG. 1, pet toy (10) comprises wall (12), inlet (14), outlet (16), and interior chamber (18). Pet toy (10) is constructed of a resilient and durable material, e.g., a thermoplastic elastomer, rubber, vinyl, silicone, or other suitable polymeric material. Pet toy (10) retains its shape when not in use, but is operable to deform when played with by a pet or handled by a person. Pet toy (10) is configured to be more deformable in certain regions than in other regions. This varied range of deformability facilitates either loading pet toy (10) with a food item, cleaning pet toy (10), or directing or channeling the pet's chewing to a food item contained within interior chamber (18) such that the food is broken up into smaller pieces or juiced. Thereafter, the smaller pieces and/or juices leave pet toy (10), thereby providing the pet with a reward.

As shown in FIG. 1, wall (12) has a wall thickness associated with it. In the present example, the wall thickness is varied to achieve the various degrees of deformability or rigidity. For instance, upper portion (20) near inlet (14) may have a wall thickness of approximately 0.45 inches. Middle portion (24) may have a wall thickness of approximately 0.15 inches, Lower portion (22) may have a wall thickness of approximately 0.30 inches. The overall width of pet toy (10) may be represented by L1, which in some instances may be approximately 2.67 inches. The overall height of pet toy (10) may be represented by L2, which in some instances may be approximately 2.97 inches. It will be understood that the dimensions described regarding FIG. 1 are purely exemplary. Other dimensions can be used as will be apparent to one of ordinary skill in the art in view of the teachings herein. In the present example, pet toy (10) generally has thicker wall thickness regions near upper portion (20) and lower portion (22). Middle portion (24) has a thinner wall thickness for wall (12). With this exemplary configuration, upper and lower portions (20, 22) are generally more rigid such that they cannot be easily deformed by the pet when pet toy (10) is in use. Middle portion (24) is less rigid such that it is more easily deformed by the pet when pet toy (10) is in use and to facilitate the pet manipulating food within chamber (18). Based on the teachings herein, various suitable ways to configure pet toy (10) such that pet toy (10) has different rigidity properties in different regions of pet toy (10) will be apparent to one of ordinary skill in the art.

Figure 2:
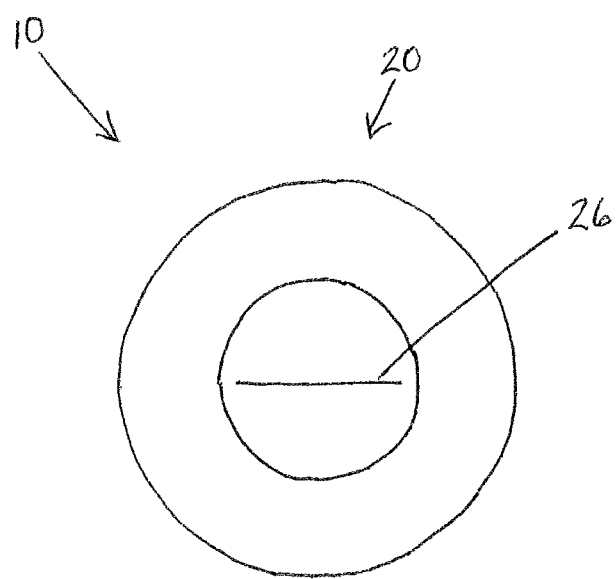
FIG. 2 depicts a top, plan view of the exemplary pet toy juicer and food dispenser of FIG. 1.

As shown in FIG. 2, in some versions pet toy (10) comprises slit (26) at upper portion (20). Slit (26) provides access from the exterior of pet toy (10) to interior chamber (18) by way of inlet (14). In the present example, slit (26) is configured so that a person can load pet toy (10) with a food item by compressing pet toy (10) on opposing sides of the axis defined by slit (26). This action causes slit (26) to separate to open sufficiently to allow a food item to be forced through inlet (14) and into interior chamber (18). Slit (26) can also be used to facilitate cleaning of pet toy (10) between uses. Slit (26) also functions to inhibit an inserted food item from exiting pet toy (10) from inlet (14) when pet toy (10) is being played with by a pet. Of course in other versions slit (26) can be omitted or replaced by another structure as will be apparent to one of ordinary skill in the art in view of the teachings herein.

Figure 3:
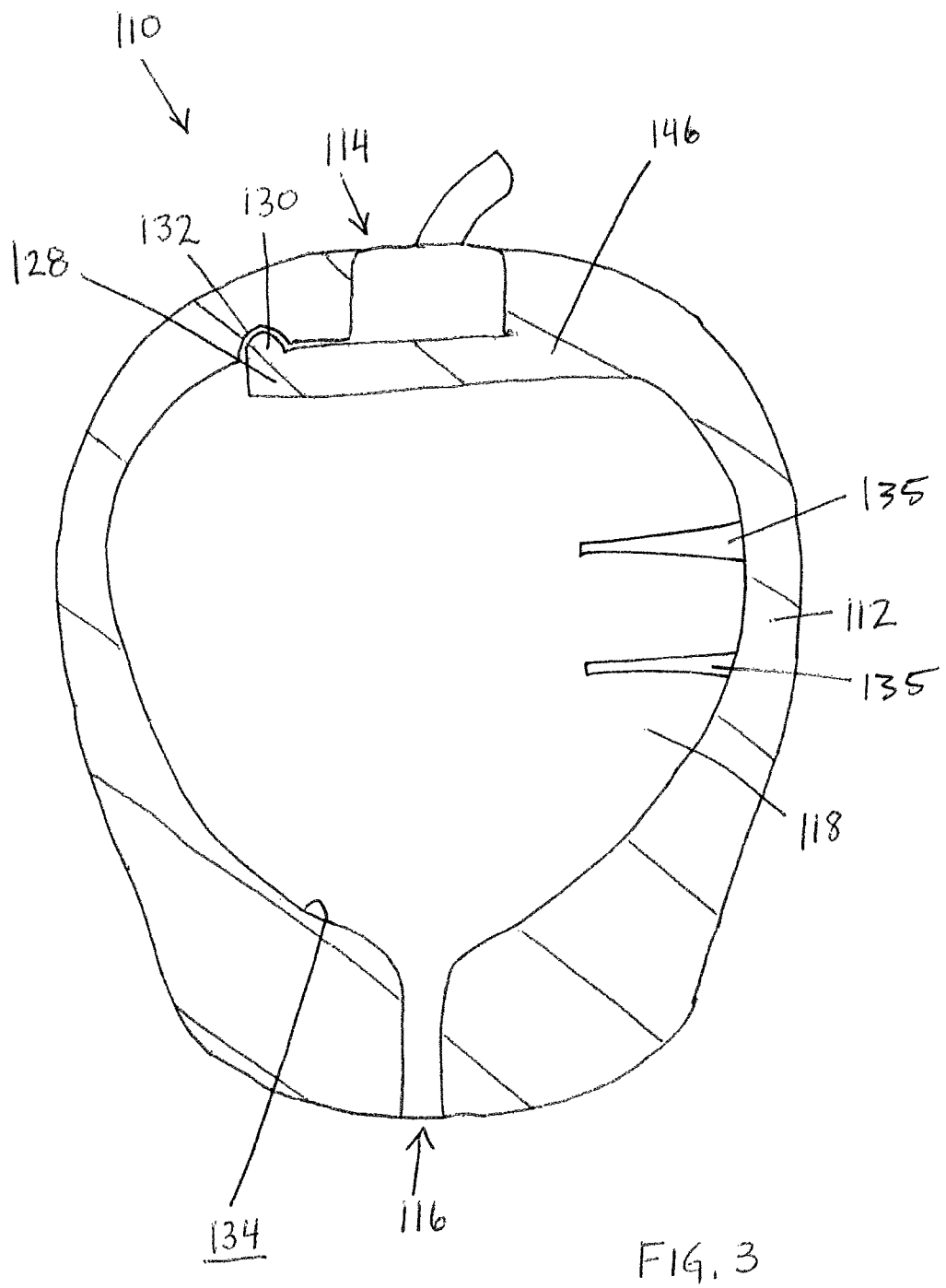
FIG. 3 depicts a side, cross section view of an alternative exemplary pet toy juicer and food dispenser showing a flap along a top portion.

FIG. 3 shows an alternative version of a pet toy juicer and food dispenser, pet toy (110), comprising a flap (128) near inlet (114). It will be appreciated that pet toy (110) is substantially similar to pet toy (10) shown in FIG. 1. In the present example, flap (128) extends off of wall (112) defining a portion of interior chamber (118). In some versions flap (128) is formed integral with wall (112). In some other versions flap (128) can be a separate piece from wall (112). Flap (128) may comprise a resilient material and includes a flexible hinge (146) that connects with wall (112). In this configuration, a person can load a food item within pet toy (110) by pushing the food item through inlet (114) while pushing flap (128) such that flap (128) folds or bends into the area of interior chamber (118) to allow the food item to be placed within pet toy (110) in interior chamber (118). As shown in the illustrated version, flap (128) is configured to be large enough such that flap (128) extends past inlet (114) such that flap (128) closes off inlet (114). Furthermore, this configuration inhibits flap (128) from bending in a direction away from interior chamber (118), e.g., bending backward to protrude out of inlet (114). The configuration of flap (128) is such that food can be easily placed within pet toy (110), but not easily forced out from inlet (114) when pet toy (110) is being played with by a pet. Flap (128) is manipulatable by a person to further permit a person to retrieve any food item or food item remnant from interior chamber (118), e.g., for cleaning pet toy (110) between uses.

Also as shown in FIG. 3, in some versions flap (128) comprises tab (130). Tab (130) engages with a corresponding recess (132). Recess (132) is formed in interior surface (134) of wall (112). The engagement of tab (130) and recess (132) provides for additional securing of flap (128) when a pet is playing with pet toy (110) to inhibit flap (128) from either folding backward to protrude out of inlet (114) or from allowing a food item or a portion of the food item from exiting pet toy (110) through inlet (114). Tab (130) and recess (132) are operable to act as a locking mechanism for flap (128) and flap (128) may act as a valve for placement and removal of food by a person. As shown in the illustrated version, a single tab (130) and recess (132) are used. In other versions, multiple tabs (130) and multiple recesses (132) can be used. Also in the illustrated version, tab (130) and recess (132) have round or circular corresponding shapes in cross section. In other versions, other corresponding shapes can be used to provide an engaging configuration as shown in the illustrated version. Various ways to configure pet toy (110) with an additional securing structure as described here will be apparent to one of ordinary skill in the art in view of the teachings herein.

As understood from the figures, in some instances and versions, to create a toy that provides a longer play time experience, larger food pieces are placed within pet toy (10, 110), as opposed to placing smaller food pieces. In such versions, inlet (14, 114) may be larger to allow for insertion of the larger food item. At the same time, in such versions, to retain the food item within pet toy (10, 110) to prolong the play experience, a hindering structure, e.g., flap (128) or slit (26) as described herein, etc., can be used to inhibit the food item from exiting the same way it entered—through the larger inlet (14, 114) opening. Instead, the inserted food item, once broken up to some extent, is directed to outlet (16, 116) that can be configured to be smaller than inlet (14, 114). Pet toy (10, 110) may comprise any number of inlets (14, 114) and outlets (16, 116), and such inlets (14, 114) and outlets (16, 116) can be positioned in a variety of locations on pet toy (10, 110).

In some versions of pet toy (110), interior surface (134) along interior chamber (118) can be textured with abrasive grooves or indents or other structures to promote breaking up of the food item located within chamber (118) as a pet chews on pet toy (110). Exemplary structures for interior surface (134) can include rigid spikes (135) or bars or other projections that extend inward from interior surface (134) to interior chamber (118) to contact the food item. Other structures and surface treatments for interior surface (134) will be apparent to one of ordinary skill in the art in view of the teachings herein.

Figure 4:
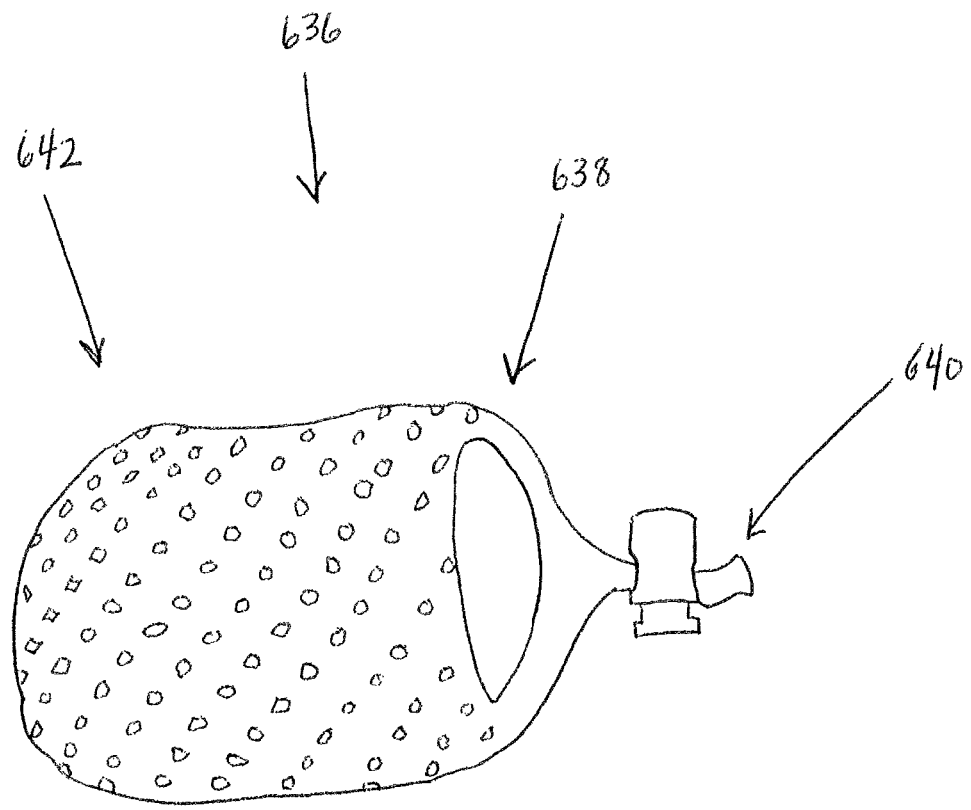
FIG. 4 depicts an exemplary pouch or bladder for use with an exemplary pet toy juicer and food dispenser.

In some versions pet toy (110) is dishwasher safe for cleaning. In some instances where pet toy (110) comprises pouch (636) as shown in FIG. 4, pouch (636) is also dishwasher safe for cleaning. In some versions, pet toy (110) may, in addition or in the alternative, be microwave safe for disinfecting between uses. In some versions, flap (128) and slit (126) can be used in the same pet toy (110) such that for any food item to enter or exit from inlet (114) the food item must pass through two structures.

In some versions pet toy (10, 110) comprises a removable pouch (636) or bladder shown in FIG. 4. Of course, pet toy (10, 110) can function without pouch (636) too. Pouch (636) has an opening (638) on one end for inserting a food item within pouch (636). In the illustrated version pouch (636) includes closure (640) that can be used to tighten and loosen a drawstring to open and close opening (638). Other suitable methods for opening and closing pouch (636) may be used as would be apparent to one of ordinary skill in the art in view of the teachings herein. Pouch (636) also comprises a plurality of openings (642) through which small pieces of food or juice can exit from pouch (636). Ultimately, when pouch (636) is located within interior chamber (18, 118) of pet toy (10, 110) respectively, then the pieces of food or juice that exit pouch (636) can then later exit outlet (16, 116) of pet toy (10, 110) respectively. With such a configuration, pet toy (10, 110) is configured such that for the food piece or juice to exit pet toy (10, 110) and reach the pet, the food piece or juice must pass through more than one structure—in the present example, first through pouch (636) and second through wall (12, 112) of pet toy (10, 110) respectively at one or more outlets (16, 116). As a result, it will be appreciated that food pieces within pouch (636) held inside of pet toy (10, 110) may require the pet to play with pet toy (10, 110) for longer before food pieces leave outlets (16, 116) to reward the pet.

The plurality of openings (642) of pouch (636) can be sized such that they allow small pieces of food to escape pouch (636). In some versions, plurality of openings (642) can be small such that they only allow food pulp and juice to escape pouch (636). In some versions of pouch (636), plurality of openings (642) can be of different sizes, while in some other versions plurality of openings (642) can be generally of the same size. Pouch (636) further assists a person in removing the food item from within pet toy (10, 110), for example for cleaning pouch (636) and pet toy (10, 110) between uses. In the present example pouch (636) is made from a synthetic mesh material, but other suitable washable, durable materials for pouch (636) will be apparent to one of ordinary skill in the art in view of the teachings herein.

FIGS. 5 and 6 show an alternative exemplary version of a pet toy juicer and food dispenser, pet toy (710), with inlet (714) shaped like a sliced piece of food—in the illustrated version an apple slice. Furthermore, a plurality of outlets (716) can be used that are positioned on wall (712) and extend generally perpendicular to inlet (714). Pet toy (710) may also include an interior divider (744). Interior divider (744) is positionable within interior chamber (718) such that interior divider (744) helps retain the food item near the outlets (716) instead of the food item falling down to the lower portion (722) of pet toy (710). In view of the teachings herein, other positions and ways for use interior divider (744) to facilitate use of pet toy (710) will be apparent to one of ordinary skill in the art.

In some versions, for example as shown in FIG. 7, instead of or in addition to flap (128) and/or slit (26) as described above, pet toy (810) can be configured as two or more pieces that are selectively attachable. For example, where pet toy (810) is shaped like an apple, pet toy (810) can be constructed of first and second parts (848, 850) that are threadably attachable by corresponding threaded portions (852, 854). Thus, a person can unscrew the parts to place the food within interior chamber (818) and then assemble the parts before providing pet toy (810) to a pet. The food pieces and/or juice can exit pet toy (810) from outlet (816) in the same or similar manner as described above relative to pet toy (10, 110). In such versions as the one illustrated by pet toy (810), threaded portions (852, 854) may be more rigid and may be selectively positioned near the portions of pet toy (810) that are intended to be more rigid as described above. In view of the teachings herein, other ways to modify pet toy (810) for placement and securing of a food item within pet toy (810) will be apparent to one or ordinary skill in the art.

FIG. 8 depicts an exemplary pet toy (900), shown in cross section, having first and second compartments (902, 904), with first compartment (902) for use as a juicer and/or food dispenser as described above, and second compartment (904) for retaining an optional chewable toy item, e.g., an empty plastic bottle. It will be appreciated that pet toy (900) may be constructed in accordance with the teachings shown in U.S. nonprovisional patent application Ser. No. 13/559,046, entitled "Pet Toy" and filed Jul. 26, 2012, which is incorporated by reference in its entirety. Pet toy (900) is constructed from a resilient and durable material as described above, and pet toy (900) is configured to retain its shape when not in use, but deform when being played with by a pet or handled by a person. As shown in FIG. 8, pet toy (900) comprises wall (912) that has varying thickness along pet toy (900). This varying thickness of wall (912) provides for varying regions of rigidity in pet toy (900) to facilitate a desired action at desired portions of pet toy (900), e.g., producing a crinkling noise from a pet biting on an inserted plastic bottle or breaking up an inserted item of food from the pet's biting action. However, wall (912) is not required to have a varying thickness in all versions of pet toy (900).

Pet toy (900) comprises inlet (914) and flap (928) at upper portion (920) near first compartment (902). Pet toy (900) further comprises outlet (916) near first compartment (902). Inlet (914), outlet (916), and flap (928) operate the same or similar to as described above with reference to FIGS. 1-7. Pet toy (900) also comprises divider (906) that separates first and second compartments (902, 904). In this fashion, an item of food inserted within first compartment (902) cannot pass through to second compartment (904). In some versions, divider (906) can be omitted.

FIGS. 9-11 depict another exemplary version of a pet toy juicer and food dispenser, pet toy (1000), having a first compartment (1002) and second compartment (1004). Furthermore, a separate outlet is omitted and inlet (1014), which in the present example is in the shape of a dog treat, serves as both the entrance and exit for a food item, e.g., one or more dog treats. In the illustrated version, divider (1006) comprises openings (1008). When second compartment (1004) contains a plastic bottle (1003) as shown, opening (1008) can be sealed by the lid of the plastic bottle pressing against opening (1008), although this sealing effect of the plastic bottle lid is not required in all versions. Opening (1008) facilitates removal of the plastic bottle by a person. Such removal is facilitated because another object can be inserted through inlet (1014) and opening (1008) to push the plastic bottle out of pet toy (1000) through star-shaped opening (1012) shown in FIG. 11.

In some versions of pet toy (1000), outlets such as outlet (16) shown in FIG. 1 may be positioned in both first and second compartments (1002, 1004) such that either or both first and second compartments (1002, 1004) can serve as food holding locations. In a version where second compartment (1004) holds food instead of a chew toy, e.g., plastic bottle, the food item can be inserted via star-shaped opening (1012). Furthermore, a flap similar to flap (128) shown in FIG. 3 or flap (928) shown in FIG. 8 can be incorporated into second compartment (1004) on the inside of star-shaped opening (112) in some versions. In some versions divider (1006) can comprise openings of sufficient size to allow an inserted food item to pass between first and second compartments (1002, 1004). In view of the teachings herein, other configurations for pet toy (1000) will be apparent to one of ordinary skill in the art.

FIGS. 12-16 illustrate another exemplary version of a pet toy juicer and food dispenser, pet toy (200), configured in the shape of an apple. Pet toy (200) comprises outer body (204), flaps (202), and inlet (214) as seen in FIG. 12. Pet toy (200) further comprises chamber (218), outlet (216), and ribs (208) as seen in FIGS. 13-16. Wall (212) generally defines chamber (218). In some versions, ribs (208) connect with an underside of respective flaps (202) from within chamber (218). Ribs (208) further connect to an interior surface of wall (212). As described further below, flaps (202) and ribs (208) form a valve that is capable of opening and closing to insert, e.g., a food item into pet toy (200). Also as described more below, the valve defined by flaps (202) and ribs (208) is biased to be in a closed position when pet toy (200) is at rest or not being manipulated by a user or pet.

Pet toy (200) is constructed of a resilient and durable material, e.g., a thermoplastic elastomer, rubber, vinyl, silicone, or other polymeric material. Pet toy (200) retains its shape when not in use, but can deform when played with by a pet or handled by a person. Pet toy (200) can be configured to be more deformable in certain regions than in other regions. This varied range of deformability facilitates either loading pet toy (200) with a food item, cleaning pet toy (200), or directing or channeling the pet's chewing to a food item contained within interior chamber (218) such that the food is broken up into smaller pieces or juiced. For example, in some versions ribs (208) act to help prevent an item of inserted food from escaping chamber (218) from inlet (214) from which the item of food was inserted. In such versions, ribs (208) help retain the food within chamber (218) and/or help direct food toward outlet (216). In such versions ribs (208) achieve this end by adding rigidity to the upper area of pet toy (200) where flaps (202) are located. This in turn helps flaps (202) remain in a closed position as shown in FIG. 12.

In some versions of pet toy (200), pet toy (200) can be turned inside out. This can be done for cleaning purposes or to dislodge an item from the interior of pet toy (200) if needed. Pet toy (200) is further comprised of a dishwasher safe and/or microwave safe material, but these features are not required in all versions. In the present example, pet toy (200) can be turned inside out by pushing the region near outlet (216) upward toward the region near inlet (214). This lower region near outlet (216) can ultimately be pushed out through inlet (214) to achieve the result of turning pet toy (200) inside out.

The reverse process can be used to reconfigure pet toy (200) back to its normal (not inside out) state. In some versions, once pet toy (200) has been turned inside out, the configuration of pet toy (200) is such that pet toy (200) can be returned back to its normal state by simply squeezing pet toy (200). In such versions, the resilient nature of the materials of construction for pet toy (200) promote pet toy (200) maintaining its normal state. In other words, the materials of pet toy (200) impart a natural bias for pet toy (200) to return to its normal state and an action like squeezing pet toy (200), when in its inside out state, will activate the natural bias for pet toy (200) to return to its normal state.

Pet toy (200), in some versions, can be used with pouch (636) as described above with respect to pet toy (10). Also as described above with respect to pet toy (10), interior surface (234) of wall (212) of pet toy (200), in some versions, can be textured with abrasive grooves or indents or other structures to promote breaking up of the food item located within chamber (218) as a pet chews on pet toy (200). Exemplary structures for interior surface (234) can include rigid spikes or bars or other projections that extend inward from interior surface (234) to interior chamber (218) to contact the food item. Other structures and surface treatments for interior surface (234) will be apparent to one of ordinary skill in the art in view of the teachings herein.

FIGS. 17-23 depict other exemplary pet toy juicer and food dispensers. FIG. 17 generally illustrates a cross section view of pet toy (300) configured for use with baby carrots to act as a pet toy juicer and food dispenser. Of course other food items may be used too, e.g. other vegetables like celery, cucumbers, squash, zucchini, etc. or other pet treats like dog biscuits or bones etc. among other things. Pet toy (300) may be in the shape of a larger carrot or abstract carrot, although other shapes can be used. In the illustrated version shown in FIG. 17, pet toy (300) comprises wall (312) having a thickness of about ⅜ inches. Wall (312) is defined by interior surface (334) and exterior surface (336). Interior surface (334) further defines chamber (318). In the illustrated version, the diameter of chamber (318) varies and at about its narrowest point is about ⅜ inches. Wall (312) comprises directional changes that define gripping features (338). These gripping features (338) extend into and away from the space defined by chamber (318) and create the varying diameter of chamber (318) as shown. In some versions the diameter of chamber (318) may be greater or less depending on the size of the food item to be inserted within chamber (318). In the present example, pet toy (300) is about 4.5 inches in length, but could be longer or shorter in other versions. Pet toy (300) also comprises openings (314) on each end that serve as both inlets for placing food and outlets for releasing food.

When using pet toy (300), baby carrots can be placed within chamber (318) from either or both sides of pet toy (300) via openings (314). Gripping features (338) are configured such that the food item, in this example baby carrot, is held or gripped snuggly or tightly in position within chamber (318). This tight fit is such that it inhibits the pet from being able to too easily remove the food item from pet toy (300). By making it somewhat difficult to remove the food item, the pet's play experience is lengthened. In the present example, the up and down spaced oriented gripping features (338) are further configured such that when a pet compresses pet toy (300), wall (312) contacts the baby carrot in a non-uniform manner such that the forces exerted on the baby carrot are not evenly distributed along the length of the carrot. This in turn causes the baby carrot to be moved laterally along the direction of the longitudinal axis defined by chamber (318) in response to the compression exerted on exterior surface (336)

of pet toy (300). With sufficient compression and/or repeated compression along the length of pet toy (300), one or more of the baby carrots are released from one of openings (314) and the pet has then obtained its reward. In addition, baby carrots or other food may be subject to a first level of compression by the pet to promote the release of a juice from openings (314) due to the pet chewing or playing with pet toy (300). Thereafter, the pet may further compress pet toy (300) to subject the baby carrots to a second level of compression to promote the release of pieces of baby carrots from openings (314). In some instances, sufficient compression may allow for the food item to be broken into smaller pieces that may then exit from one of openings (314). In some instances, the resilient nature of pet toy (300) is specifically designed to avoid over-compression that would allow the baby carrot to be easily or too quickly broken up into smaller pieces by a pet's compression action on pet toy (300). This would then promote a longer play experience for the pet before obtaining its reward.

Pet toy (300), in the present example, comprises center portion (340). Near center portion (340) gripping features (338) end and a flat, parallel portion of wall (312) begins. In the illustrated version, center portion (340) is about 0.5 inches in length, but this dimension is not required in all versions. Center portion (340) is configured such that a pet's compression of pet toy (300) at or near center portion (340) promotes movement of the food item within chamber (318) toward openings (314) on each end of pet toy (300). In some versions center portion (340) can be configured to be a more easily or more difficult compressible region of pet toy (300) compared to other areas further outwardly of center portion (340).

Pet toy (300) can be made from the materials described above with respect to pet toys (10, 110, 200, 710, 810, 900, 1000), and have similar properties in terms of compressibility and resiliency. Also pet toy (300) can be cleaned, sanitized, or disinfected in the same ways as described above with respect to pet toys (10, 110, 200, 710, 810, 900, 1000).

FIGS. 18-20 depict another exemplary pet toy juicer and food dispenser, pet toy (400). Pet toy (400) is similar in many ways to pet toy (300) described above. Pet toy (400) comprises wall (412) having a thickness of about 0.32 inches, Wall (412) is defined by interior surface (434) and exterior surface (436). Interior surface (434) further defines chamber (418). As shown in the illustrated version, the diameter of chamber (418) varies and at about its narrowest point is about ⅜ inches. Wall (412) comprises directional changes that create gripping features (438) and also give pet toy (400) a ribbed appearance or a ribbed surface texture. These gripping features (438) extend into and away from the space defined by chamber (418) and create the varying diameter of chamber (418) as shown. In some versions the diameter of chamber (418) may be greater or less depending on the size of the food item to be inserted within chamber (418). In the present example, pet toy (400) is about 4.5 inches in length, but could be longer or shorter in other versions. Pet toy (400) also comprises openings (414) on each end that serve as both inlets for placing food and outlets for releasing food.

When using pet toy (400), baby carrots can be placed within chamber (418) from either or both sides of pet toy (400) via openings (414). Gripping features (438) are configured such that the food item, in this example baby carrot, is held or gripped snuggly or tightly in position within chamber (418). This tight fit is such that it inhibits the pet from being able to too easily remove the food item from pet toy (400). By making it somewhat difficult to remove the food item, the pet's play experience is lengthened. In the present example, the up and down spaced oriented gripping features (438) are further configured such that when a pet compresses pet toy (400), wall (412) contacts the baby carrot in a non-uniform manner such that the forces exerted on the baby carrot are not evenly distributed along the length of the carrot. This in turn causes the baby carrot to be moved laterally along the direction of the longitudinal axis defined by chamber (418) in response to the compression exerted on exterior surface (436) of pet toy (400). With sufficient compression and/or repeated compression along the length of pet toy (400), one or more of the baby carrots are released from one of openings (414) and the pet has then obtained its reward. In some instances, sufficient compression may allow for the food item to be broken into smaller pieces that may then exit from one of openings (414). In some instances, the resilient nature of pet toy (400) is specifically designed to avoid over-compression that would allow the baby carrot to be easily or too quickly broken up into smaller pieces by a pet's compression action on pet toy (400). This would then promote a longer play experience for the pet before obtaining its reward.

Pet toy (400), in the present example, comprises center portion (440). Near center portion (440) gripping features (438) end and a flat, parallel portion of wall (412) begins. Center portion (440) is configured such that a pet's compression of pet toy (400) at or near center portion (440) promotes movement of the food item within chamber (418) toward openings (414) on each end of pet toy (400). In some versions center portion (440) can be configured to be a more easily or more difficult compressible region of pet toy (400) compared to other areas further outwardly of center portion (440). In the present example, chamber (418) is divided into two portions by closing chamber (418) at or near center portion (440). In other words, pet toy (440) comprise dividing wall (442) that generally bisects chamber (418) to create first chamber portion (444) and second chamber portion (446). In some other versions, dividing wall (442) is omitted partially or entirely such that pet toy (400) has a single chamber (418).

Pet toy (400) can be made from the materials described above with respect to pet toys (200, 300), and have similar properties in terms of compressibility and resiliency. Also pet toy (400) can be cleaned, sanitized, or disinfected in the same ways as described above with respect to pet toys (200, 300).

FIGS. 21-23 depict another exemplary pet toy juicer and food dispenser, pet toy (500). Pet toy (500) is similar in many ways to pet toy (300) and pet toy (400) described above. Pet toy (500) comprises wall (512) having a thickness of about ⅜ inches. Wall (512) is defined by interior surface (534) and exterior surface (536). Interior surface (534) further defines chamber (518). As shown in the illustrated version, the diameter of chamber (518) varies and at about its narrowest point is about ⅜ inches. Wall (512) comprises directional changes that create gripping features (538) and also give pet toy (500) a ribbed appearance or a ribbed surface texture. These gripping features (538) extend into and away from the space defined by chamber (518) and create the varying diameter of chamber (518) as shown. In some versions the diameter of chamber (518) may be greater or less depending on the size of the food item to be inserted within chamber (518). In the present example, pet toy (500) is about 4.5 inches in length, but could be longer or shorter in other versions. Pet toy (500) also comprises openings (514) on each end that serve as both inlets for placing food and outlets for releasing food.

When using pet toy (500), baby carrots can be placed within chamber (518) from either or both sides of pet toy (500) via openings (514). Gripping features (538) are configured such that the food item, in this example baby carrot, is held or gripped snuggly or tightly in position within chamber (518). This tight fit is such that it inhibits the pet from being able to too easily remove the food item from pet toy (500). By making it somewhat difficult to remove the food item, the pet's play experience is lengthened. In the present example, the up and down spaced oriented gripping features (538) are further configured such that when a pet compresses pet toy (500), wall (512) contacts the baby carrot in a non-uniform manner such that the forces exerted on the baby carrot are not evenly distributed along the length of the carrot. This in turn causes the baby carrot to be moved laterally along the direction of the longitudinal axis defined by chamber (518) in response to the compression exerted on exterior surface (536) of pet toy (500). With sufficient compression and/or repeated compression along the length of pet toy (500), one or more of the baby carrots are released from one of openings (514) and the pet has then obtained its reward. In some instances, sufficient compression may allow for the food item to be broken into smaller pieces that may then exit from one of openings (514). In some instances, the resilient nature of pet toy (500) is specifically designed to avoid over-compression that would allow the baby carrot to be easily or too quickly broken up into smaller pieces by a pet's compression action on pet toy (500). This would then promote a longer play experience for the pet before obtaining its reward.

Pet toy (500), in the present example, comprises center portion (540). Near center portion (540) gripping features (538) end and a flat, parallel portion of wall (512) begins. Center portion (540) is configured such that a pet's compression of pet toy (500) at or near center portion (540) promotes movement of the food item within chamber (518) toward openings (514) on each end of pet toy (500). In some versions center portion (540) can be configured to be a more easily or more difficult compressible region of pet toy (500) compared to other areas further outwardly of center portion (540). In the present example, chamber (518) is divided into three portions by closing chamber (518) at or near center portion (540). In other words, pet toy (540) comprises dividing walls (542) that generally divide chamber (518) to create first chamber portion (544), second chamber portion (546), and third chamber portion (548). As seen in FIG. 24, third chamber portion (548) is closed off by dividing walls (542) and thus third chamber portion is not configured to retain any of the food items. In some other versions, dividing walls (542) are omitted partially or entirely such that pet toy (500) has a single chamber (518).

Pet toy (500) can be made from the materials described above with respect to pet toys (200, 300, 400), and have similar properties in terms of compressibility and resiliency. Also pet toy (500) can be cleaned, sanitized, or disinfected in the same ways as described above with respect to pet toys (200, 300, 400).

In comparing configuration among pet toys (300, 400, 500), in the depicted versions, gripping features (338, 438, 538) of pet toys (300, 400, 500) can be considered to have a sinusoidal configuration having an amplitude and wavelength (or repeat length). The amplitude can be defined as being a peak amplitude or peak-to-peak amplitude. General representations of an exemplary peak-to-peak amplitude and wavelength for gripping features (438, 538) are shown in FIGS. 20 and 23 by the alphanumeric references A1 and A1 respectively for amplitude and W1 and W2 respectively for wavelength. By way of example only, compared to pet toy (500), pet toy (400) comprises gripping features (438) with a longer wavelength, thus there are fewer peaks within chamber (418) of pet toy (400). In some versions, the pet toy in this configuration comprises about 4-8 gripping features that extend toward the interior of the pet toy to contact the inserted food items. In view of the teachings herein, various modifications and configurations for the gripping features and other features of pet toys (300, 400, and 500) will be apparent to those of ordinary skill in the art.

FIGS. 24-28 illustrate another exemplary version of a pet toy juicer and food dispenser, pet toy (1200), configured in the shape of an apple. Pet toy (1200) comprises outer body (1204), flaps (1202), and inlet (1214) as seen in FIG. 24. Pet toy (1200) further comprises chamber (1218), outlet (1216), and ribs (1208) as seen in FIGS. 27 and 28. Wall (1212) generally defines chamber (1218). In some versions, ribs (1208) connect with an underside of respective flaps (1202) from within chamber (1218). Ribs (1208) further extend the length of pet toy (1200) and connect at or near a bottom surface (1235) near outlet (1216). As described further below, flaps (1202) and ribs (1208) form a valve that is capable of opening and closing to insert, e.g., a food item into pet toy (1200). Also as described more below, the valve defined by flaps (1202) and ribs (1208) is biased to be in a closed position when pet toy (1200) is at rest or not being manipulated by a user or pet. In the illustrated version, pet toy (1200) comprises six flaps (1202) and connected to the centerline of each flap (1202) is a respective rib (1208) that extends the length of pet toy (1200) before connecting to bottom surface (1235) near outlet (1216). Flaps (1202) further define a six-pointed star-shaped opening at inlet (1214) as shown in FIG. 26. In other versions of pet toy (1200) greater or fewer numbers of flaps (1202) and ribs (1208) may be used.

Pet toy (1200) is constructed of a resilient and durable material, e.g., a thermoplastic elastomer, rubber, vinyl, silicone, or other polymeric material. Pet toy (1200) retains its shape when not in use, but can deform when played with by a pet or handled by a person. Pet toy (1200) can be configured to be more deformable in certain regions than in other regions. This varied range of deformability facilitates either loading pet toy (1200) with a food item, cleaning pet toy (1200), or directing or channeling the pet's chewing to a food item contained within interior chamber (1218) such that the food is broken up into smaller pieces or juiced. For example, in some versions ribs (1208) act to help prevent an item of inserted food from escaping chamber (1218) from inlet (1214) from which the item of food was inserted. In such versions, ribs (1208) help retain the food within chamber (1218) and/or helping to keep flaps (1202) closed and thereby directing food toward outlet (1216). In such versions ribs (1208) achieve this end by adding rigidity to the upper area of pet toy (1200) where flaps (1202) are located. This in turn helps flaps (1202) remain in a closed position as shown in FIG. 24.

In some versions of pet toy (1200), pet toy (1200) can be turned inside out. This can be done for cleaning purposes or to dislodge an item from the interior of pet toy (1200) if needed. Pet toy (1200) is further comprised of a dishwasher safe and/or microwave safe material, but these features are not required in all versions. In the present example, pet toy (1200) can be turned inside out by pushing the region near outlet (1216) upward toward the region near inlet (1214). This lower region near outlet (1216) can ultimately be pushed out through inlet (1214) to achieve the result of turning pet toy (1200) inside out. The reverse process can be used to reconfigure pet toy (1200) back to its normal (not inside out) state. In some versions, once pet toy (1200) has been turned inside out, the configuration of pet toy (1200) is such that pet toy (1200) can be returned back to its normal state by simply squeezing pet toy (1200). In such versions, the resilient nature of the materials of construction for pet toy (1200) promote pet toy (1200) maintaining its normal state. In other words, the materials of pet toy (1200) impart a natural bias for pet toy (1200) to return to its normal state and an action like squeezing pet toy (1200), when in its inside out state, will activate the natural bias for pet toy (1200) to return to its normal state.

Pet toy (1200), in some versions, can be used with pouch (636) as described above with respect to pet toys (10, 200). Also as described above with respect to pet toy (10), interior surface (1234) of wall (1212) of pet toy (1200), in some versions, can be textured with abrasive grooves or indents or other structures to promote breaking up of the food item located within chamber (1218) as a pet chews on pet toy (1200). Exemplary structures for interior surface (1234) can include rigid spikes or bars as those shown in FIG. 3 or other projections that extend inward from interior surface (1234) to interior chamber (1218) to contact the food item. Still in the illustrated version of FIGS. 24-28, ribs (1208) project within interior chamber (1218) and can act similar to spikes or bars to contact an inserted food item and promote breaking up or juicing the food item. Other structures and surface treatments for interior surface (1234) and/or ribs (1208) will be apparent to one of ordinary skill in the art in view of the teachings herein.

In some versions, pet toy (1200) has a diameter of about 2.91 inches. Also the diameter of star-shaped opening as shown in FIG. 26 can be about 2.11 inches. The spacing between flaps (1202) can be about 0.14 inches, which would equal the width of one of the pointed spokes or portions of the star-shaped opening. The center of star-shaped opening can have a diameter of 0.42 inches in some versions. Pet toy (1200) can have an overall height of about 3.050 inches. In the illustrated version, the thickness of wall (1212) can vary along the length of pet toy (1200). For instance, wall (1212) can have a thickness of 0.15 inches near outlet (1216) and a thickness of 0.65 inches near inlet (1214). The varying thickness of wall (1212) can be used to create one or more regions of greater rigidity where wall (1212) is thicker, and one or more regions of less rigidity where wall (1212) is less thick. Of course other structures such as ribs (1208) can be used as rigidity enhancing members for pet toy (1200). Also, in the illustrated version, outlet (1216) has a diameter of about 0.23 inches. Of course any or all of these and other dimensions can be varied such that pet toy (1200) can be adapted for use with pets of various sizes or adapted for use with various sized food items that may be used with pet toy (1200). In view of the teachings herein, these and other modifications will be apparent to those of ordinary skill in the art.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of any claims that may be presented and is understood not to be limited to the details of structure and operation shown and described in the specification and drawings.

I claim:

1. A pet toy configured for receiving a food item, wherein the pet toy comprises:
   (a) a durable and resilient outer wall;
   (b) an interior chamber, wherein the interior chamber is defined by the outer wall;
   (c) an inlet formed in the outer wall providing access to the interior chamber, wherein the outer wall comprises a plurality of flaps, wherein the plurality of flaps surrounds the inlet;
   (d) an outlet formed in the outer wall providing access to the interior chamber, wherein the outlet is separate and spaced from the inlet; and
   (e) wherein the pet toy comprises one or more regions of greater rigidity and one or more regions of less rigidity created by rigidity enhancing members located within the interior chamber, wherein the rigidity enhancing members extend longitudinally in a continuous fashion from proximate to the inlet to proximate to the outlet.

2. The pet toy of claim 1, wherein the one or more regions of greater rigidity and one or more regions of less rigidity are created by varying the thickness of the outer wall.

3. The pet toy of claim 1, wherein the inlet comprises a slit.

4. The pet toy of claim 1, further comprising a plurality of ribs located within the interior chamber.

5. The pet toy of claim 1, wherein the pet toy is capable of being turned inside-out.

6. The pet toy of claim 1, further comprising a pouch having an open structure and at least one pouch inlet, wherein the pouch is configured to hold the food item, wherein the pouch is configured to fit within the interior chamber of the pet toy.

7. A pet toy configured for receiving a food item, wherein the pet toy comprises:
   (a) a durable and resilient outer wall;
   (b) an interior chamber, wherein the interior chamber is defined by the outer wall;
   (c) an inlet formed in the outer wall providing access to the interior chamber;
   (d) an outlet formed in the outer wall providing access to the interior chamber, wherein the outlet is separate and spaced from the inlet;
   (e) a flap in communication with the durable and resilient outer wall, wherein the flap is configured to at least partially block the inlet; and
   (f) wherein the pet toy comprises one or more regions of greater rigidity and one or more regions of less rigidity created by rigidity enhancing members located within the interior chamber, wherein the rigidity enhancing members extend longitudinally in a continuous fashion from proximate to the inlet to proximate to the outlet.

8. A pet toy configured for receiving a food item, wherein the pet toy comprises:
   (a) a durable and resilient outer wall;
   (b) an interior chamber, wherein the interior chamber is defined by the outer wall;
   (c) an inlet formed in the outer wall providing access to the interior chamber;
   (d) an outlet formed in the outer wall providing access to the interior chamber, wherein the outlet is separate and spaced from the inlet;
   (e) a plurality of ribs located within the interior chamber, wherein the plurality of ribs connect with a plurality of flaps formed in the outer wall and surrounding the inlet; and
   (f) wherein the pet toy comprises one or more regions of greater rigidity and one or more regions of less rigidity created by rigidity enhancing members located within the interior chamber, wherein the rigidity enhancing members extend longitudinally in a continuous fashion from proximate to the inlet to proximate to the outlet.

* * * * *